United States Patent
Kinoshita et al.

[11] Patent Number: 6,066,928
[45] Date of Patent: May 23, 2000

[54] ELECTRIC SYSTEM FOR ELECTRIC VEHICLE

[75] Inventors: Shigenori Kinoshita; Koetsu Fujita; Junichi Ito, all of Tokyo, Japan

[73] Assignee: Fuji Electric Co., Ltd., Japan

[21] Appl. No.: 09/212,499

[22] Filed: Dec. 15, 1998

[30] Foreign Application Priority Data

Dec. 15, 1997 [JP] Japan .................................. 9-345014

[51] Int. Cl.[7] .................................. H02P 1/00; B60K 1/00
[52] U.S. Cl. .......................... 318/139; 318/439; 180/65.8
[58] Field of Search ..................... 318/139, 254, 318/439, 138, 798–817; 180/65.1, 65.3, 65.4, 65.8

[56] References Cited

U.S. PATENT DOCUMENTS

| | | | |
|---|---|---|---|
| 4,117,364 | 9/1978 | Baker | 318/810 |
| 4,255,695 | 3/1981 | Plunkett et al. | 318/723 |
| 4,616,166 | 10/1986 | Cooper et al. | 318/712 |
| 4,763,347 | 8/1988 | Erdman | 318/254 |
| 4,791,340 | 12/1988 | Finney | 318/809 |
| 4,967,334 | 10/1990 | Cook et al. | 363/34 |
| 5,350,994 | 9/1994 | Kinoshita et al. | 320/15 |
| 5,757,633 | 5/1998 | Bowles | 363/71 |
| 5,852,558 | 12/1998 | Julian et al. | 363/132 |
| 5,877,600 | 3/1999 | Sonntag | 318/139 |
| 5,925,993 | 7/1999 | Lansberry | 318/139 |

*Primary Examiner*—Brian Sircus
*Attorney, Agent, or Firm*—Rossi & Associates

[57] ABSTRACT

An electric system for an electric vehicle includes a voltage type inverter that receives dc input voltage from a dc input circuit, and generates variable ac voltage of a variable frequency, and an ac motor including a plurality of windings each of which has one end connected to an ac output terminal of the voltage type inverter, the other ends of the windings being connected together to provide a neutral point of motor windings. A variable-voltage energy storage element is connected between the neutral point and a connecting point provided in the dc input circuit, and an on-vehicle dc power supply is connected to the opposite ends of the energy storage element or input terminals of the dc input circuit. The inverter performs switching operations in a zero-voltage vector mode, to operate as a chopper, so that power is transferred between the variable-voltage energy storage element, and the dc input side of the inverter.

40 Claims, 11 Drawing Sheets

ELECTRIC SYSTEM FOR ELECTRIC VEHICLE

FIELD OF THE INVENTION

The present invention relates to an electric system for an electric vehicle, which drives an electric motor for driving the vehicle by means of a voltage type inverter.

BACKGROUND OF THE INVENTION

FIG. 16 shows a known electric system for an electric vehicle, which uses a battery as a power supply. The electric system of FIG. 16 includes a main battery 1 as a dc power supply, for which a chemical battery is typically used as a high energy type battery, an ac motor 2 for driving the vehicle, a variable-voltage, variable-frequency, voltage type inverter 3 for driving the motor, reduction gears 4, a differential gear system 5, and wheels 6. The electric system also includes auxiliary electric motors 7 (only one of which is shown in FIG. 16) for driving accessories, such as an air conditioner, a power steering system, and various pumps, and an inverter 8 for driving such an auxiliary electric motor 7. The electric system further includes a capacitor 9 as a high power type battery, for which an electric double layer capacitor as a physical capacitor is used, and a chopper 10 inserted between the capacitor 9 and the main battery 1.

Generally, the high power type battery discharges electric power during acceleration of the vehicle, and absorbs braking energy of the vehicle during deceleration. Accordingly, the voltage of the capacitor 9 is lowered due to discharge of the power while the vehicle is being accelerated. While a brake is being applied to the vehicle, on the other hand, the voltage of the capacitor 9 is increased due to absorption of the power into the capacitor 9. The chopper 10 is inserted between the capacitor 9 whose voltage varies to a large extent, and the main battery 1 whose voltage is almost constant, so that power can be transferred between the capacitor 9 and the battery 1.

FIG. 17 shows an electric system of a series type hybrid electric vehicle, in which the same reference numerals as used in FIG. 16 are used for identifying the same components. The system of FIG. 17 includes an engine 11, a generator 12, a converter 13, and a battery 14 provided for absorbing a difference between the power generated by the generator 12 and the power consumed by the electric motor 2. In the series type system, electric power for running the vehicle is generated by the engine 11, generator 12 and the converter 13, and the power thus generated is used for driving the motor 2 via the inverter 3. Although various types of series type systems are available, the system shown in FIG. 17 uses a chemical battery 14 as a battery for absorbing excess power. Since the battery 14 is not of a high power type, the capacitor 9, as a high power type battery, is connected in parallel with the battery 14 with the chopper 10 inserted therebetween.

Generally, the output of the generator is not the maximum power required for acceleration or deceleration of the vehicle, but determined by the power required for constant-speed running. Thus, the power generated by the generator is smaller than the maximum power. During acceleration or deceleration of the vehicle that requires high power, therefore, electric power is supplied from or received by the capacitor 9, via the chopper 10. The chemical battery 14 absorbs power corresponding to a difference between the power generated by the generator 12, and the power consumed by the motor 2 and accessories (not illustrated). In the case where the engine 11 is stopped, and the vehicle runs only with the chemical battery 14, the battery 14 is required to provide a sufficiently high energy.

FIG. 18 shows an electric system of a parallel type hybrid electric vehicle, wherein the same reference numerals as used in FIGS. 16 and 17 are used for identifying the same components. The system of FIG. 18 includes an engine 15 for the parallel system, a generator 16, a transmission 17, a chemical battery 18, a converter (inverter) 19, an electric double layer capacitor 20 as a high power type battery, and a chopper 21. The parallel type hybrid electric vehicle may travel only due to the power of the engine 15 transmitted to the wheels through the transmission 17, or due to the electric power of the chemical battery 18 transmitted through the converter (inverter) 19 and generator 16, or due to the power of both of the engine 15 and battery 18, and each power transmitting system is selectively used depending upon applications. The parallel type vehicle also requires a high power type battery for absorbing regenerative power during braking of the vehicle, and therefore the electric double layer capacitor 20 is connected in parallel with the battery 18 via the chopper 21.

As shown in the known examples as described above, both high energy type battery and high power type battery are needed as a power supply for an electric vehicle. The high energy type battery determines the running distance of the vehicle per charge, and the high power type battery determines the acceleration performance and regenerative braking performance. If the braking energy can be sufficiently regenerated into the battery upon each braking of the vehicle, the electric vehicle provides a considerably high energy-saving effect.

The operations for driving electric vehicles are the same as those for driving current gasoline-powered vehicles, and the number of braking operations reaches as much as several tens of thousands of times. To achieve a further improved energy-saving effect, the electric vehicle is required to endure accelerating and decelerating operations performed as much as several tens of thousands of times. Namely, the battery used in the electric vehicle is desired to withstand several tens of thousands of operations for charging and discharging large power. It is, however, difficult for the currently used battery, which is typically a chemical battery, to perform several tens of thousands of operations for charging and discharging large power, and such a battery can perform at most several thousands of charging and discharging operations. In the current electric vehicles, therefore, it is necessary to replace the chemical battery with a new one after every suitable period of time, or use a high power type battery, such as an electric double layer capacitor, in addition to the chemical battery.

FIG. 19 shows (a) vehicle speed V, (b) inverter input Pi, (c) voltage Vc of the electric double layer capacitor, and input voltage Vi of the inverter, and (d) output Ps of the dc power supply (chemical battery), corresponding to each of the operating modes (accelerating mode, constant-speed running mode, and decelerating mode) of the electric vehicle.

FIG. 20 shows one example of chopper used in the systems of FIG. 16 to FIG. 18, more specifically, illustrates the chopper 10 of FIG. 16 by way of example. The chopper 10 includes switch portions 10b, 10c, in which transistors 10b1, 10c1 are respectively connected in parallel with diodes 10b2, 10c2 in the reverse direction. Namely, the negative side of each of the transistors 10b1, 10c1 is connected to the positive side of a corresponding one of the diodes 10b2, 10c3. The chopper 10 further includes a current smoothing reactor 10a, and a voltage smoothing capacitor 10d.

Electric vehicles, which are used for the same purpose as conventional gasoline-powered vehicles, are desired to satisfy the same demands as made in the gasoline-powered vehicles, for example, a long running distance per charge, high acceleration and deceleration performance, high fuel efficiency, small size and weight of its components, and low cost. Of these demands, the running performance and the fuel efficiency have been improved by using the high power type battery, such as an electric double layer capacitor, or utilizing two or more kinds of power sources to provide a hybrid system.

Even with the improved performance of the electric vehicle, there is still a significant problem in the high power type battery portion, in particular, chopper portion as shown in FIG. 20. Since the chopper portion must be of high power type, and have almost the same capacity as the inverter for driving the motor, it has been desired to reduce the size and weight of the chopper, and its cost.

SUMMARY OF THE INVENTION

It is therefore an object of the present invention to provide an electric system for an electric vehicle, wherein a high power type battery portion, in particular, chopper portion, has an improved configuration, assuring reduction in the size, weight, and cost of system devices, and improved operating efficiency of the system.

A polyphase inverter has a zero-voltage vector output mode as one of its operating modes. In this output mode, P-side switching arms 31a, 31b, 31c or N-side switching arms 32a, 32b, 32c of the inverter 3 shown in FIG. 21 are simultaneously turned on. When the inverter is in this mode, all of the terminal voltages (between lines) of a polyphase motor connected to the inverter 3 become equal to zero at the same time. By utilizing the switching operation of the inverter in the zero-voltage vector mode, and also connecting a dc power supply between a neutral point of the polyphase ac motor and the dc input side of the inverter, zero-phase-sequence power is transferred between the dc power supply and the dc input side of the inverter, during the period of the switching operation of the inverter in the zero-voltage vector mode.

FIG. 22 shows the basic system having the above arrangement, which includes a first dc power supply 1a, a three-phase electric motor 2a, a voltage type inverter 3a, and an input capacitor 31a connected to the input of the inverter 3a. One end of a winding 2a1 for each phase of the motor 2a is connected to the inverter 3a, and the other ends of all windings of the motor 2a are connected to each other, to provide a neutral point 2a2. A second dc power supply 1b is connected between the neutral point 2a2 and one terminal (N-pole side in FIG. 22) of the dc input of the inverter 3a.

With the above-described arrangement, if the inverter 3a generates a zero-voltage vector, the voltage of the dc power supply 1b becomes a zero-phase-sequence voltage as viewed from the each input terminal of the motor 2a. An equivalent circuit of this circuit for a positive-phase-sequence component operates in a known manner in which the motor 2a is driven by a conventional three-phase inverter. In an equivalent circuit for a zero-phase-sequence component, three arms of the inverter 3a are regarded as one arm that performs a switching operation at the ratio of the zero-voltage vector, and function as a two-quadrant chopper. Thus, the inverter 3a controls the zero-phase-sequence voltage, so as to realize the operation of the two-quadrant chopper. Namely, in the circuit of FIG. 22, dc power can be transferred between the dc power supply 1b and the capacitor 31a, when the inverter 3a operates in the zero-voltage vector mode. Here the winding 2a1 is used as a reactor for the chopper.

In the system as described above, since the dc input voltage of the inverter 3a can be made variable, the performance of the inverter drive system can be improved, and the size, weight, and cost of the system can be advantageously reduced.

According to one aspect of the present invention based on the above-described principle, there is provided an electric system for an electric vehicle, as shown in FIG. 23, which comprises: a dc input circuit 100; a voltage type inverter 101 that is connected to the dc input circuit 100 to receive input voltage from the dc input circuit 100, and generate variable ac voltage of a variable frequency; an ac motor 103 including a plurality of windings each of which has one end connected to an ac output terminal of the voltage type inverter 101, the other ends of the windings being connected together to provide a neutral point of motor windings; a variable-voltage energy storage element 105 connected between the neutral point and a connecting point provided in the dc input circuit 100; and an on-vehicle dc power supply 106 connected to opposite ends of the variable-voltage energy storage element 105. In this arrangement, the wiring inductance between the dc input circuit 100 and the voltage type inverter 101 is controlled to a sufficiently small value.

According to another aspect of the invention, there is provided an electric system for an electric vehicle, as shown in FIG. 24, which comprises: a dc input circuit 100 including input terminals; voltage type inverter 101 that is connected to the dc input circuit 100 to receive dc input voltage from the dc input circuit 100, and generate variable ac voltage of a variable frequency; an ac motor 103 including a plurality of windings each of which has one end connected to an ac output terminal of the voltage type inverter 101, the other ends of said windings being connected together to provide a neutral point of the motor windings; a variable-voltage energy storage element 105 connected between the neutral point and a connecting point provided in the dc input circuit 100; and an on-vehicle dc power supply 106 connected to the input terminals of the dc input circuit 100. In this arrangement, the wiring inductance between the dc input circuit 100 and the voltage type inverter 101 is controlled to a sufficiently small value.

When the inverter operates in a zero-voltage vector more, the semiconductor switches of the inverter function as a chopper switch, using motor windings as reactors. Thus, a circuit equivalent to a chopper is provided between the input capacitor and the inverter.

With this arrangement, a chopper portion that was required in a conventional high power type battery portion need not be provided, resulting in reduction in the size, weight and cost of the system.

The power for driving the electric vehicle is generated by driving an electric motor with electric power supplied through the inverter from the on-vehicle dc power supply, such as a chemical battery, engine generator, or fuel battery, and the electric power for driving the auxiliary motor is supplied from the variable-voltage energy storage element or the input capacitor of the inverter.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Some preferred embodiments of the present invention will be described with reference to the accompanying drawings.

Figure 1:
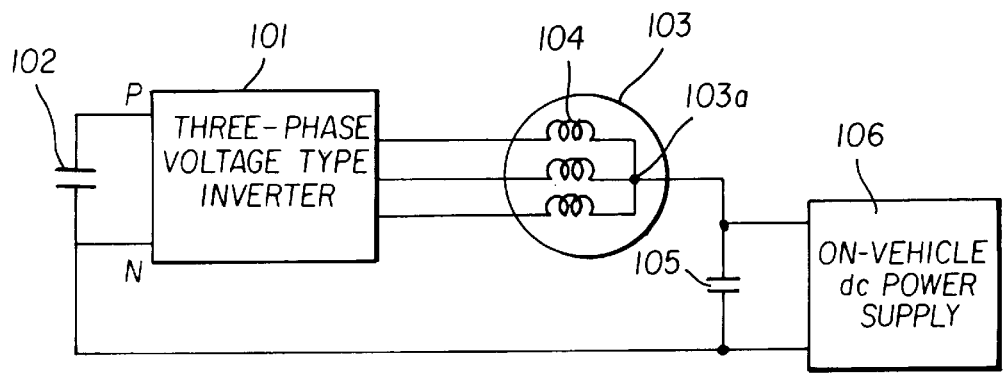
FIG. 1 is a view showing an electric system for an electric vehicle according to the first embodiment of the present invention.
Figure 16:
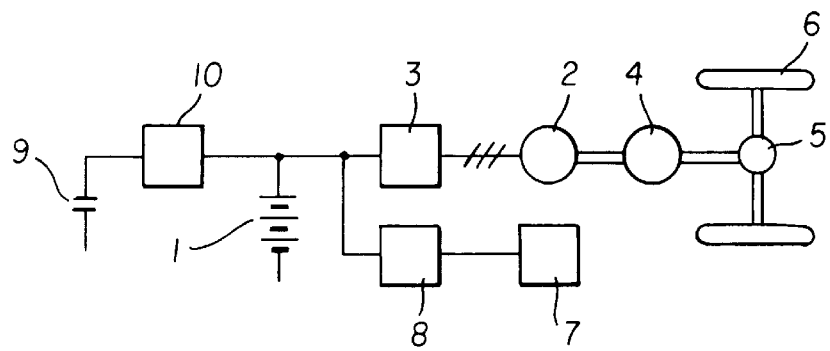
FIG. 16 is a view showing a known electric system of an electric vehicle, using a battery as a power supply.

FIG. 1 shows an electric system for an electric vehicle according to the first embodiment of the present invention. The system includes a three-phase voltage type inverter 101 corresponding to the inverter 3 of FIG. 16, an input capacitor 102 of the inverter 101, and a three-phase ac motor 103 for driving the vehicle. Each of three windings 104 of the motor 103 is connected at one end to the inverter 101, and the other ends of all of the windings 104 are connected together, to provide a neutral point 103a.

In FIG. 1, reference numeral 105 denotes a variable-voltage energy storage element, one end of which is connected to the neutral point 103 of the motor windings, and the other end of which is connected to the N-pole side of input terminals of the inverter 101. Reference numeral 106 denotes an on-vehicle dc power supply that is connected to opposite ends of the voltage-variable energy storage element 105. While one end of the voltage-variable energy storage element 105 is connected to the N-pole-side input terminal of the inverter 101 in the embodiment of FIG. 1, the element 105 may be connected to the P-pole-side input terminal.

The on-vehicle dc power supply 106 may be selected from a chemical battery, fuel battery, engine generator (dc power supply consisting of an engine, generator and a rectifier), and others. The on-vehicle dc power supply 106 is desirably a variable voltage source. As the voltage-variable energy storage element, an electric double layer capacitor or electrochemical capacitor may be used.

Figure 2:
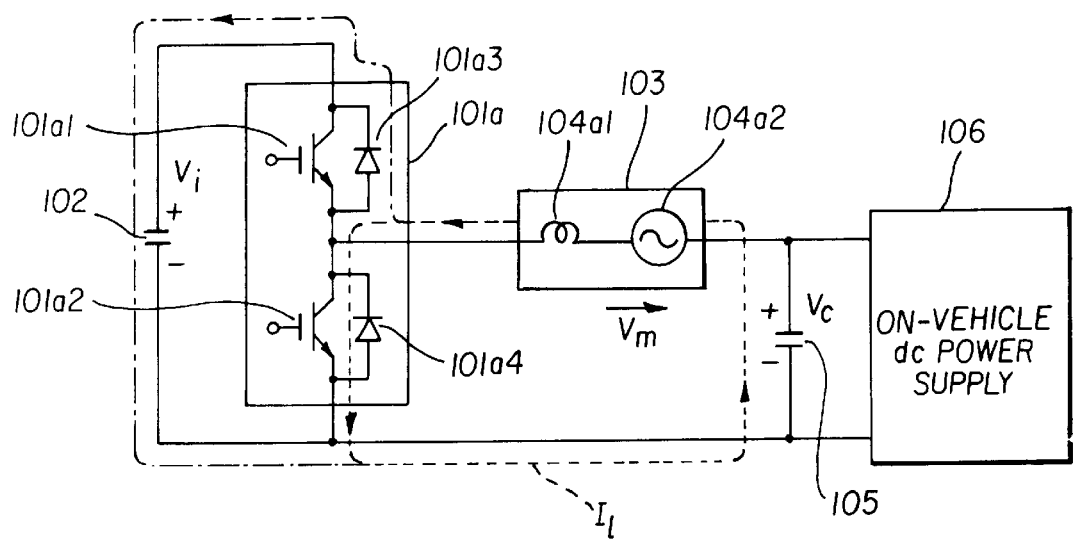
FIG. 2 is a view showing the operation of a step-up chopper of the system of FIG. 1.

Referring next to FIG. 2, the operation of the present embodiment will be described. While FIG. 2 shows a part of the circuit of FIG. 1 that corresponds to one phase (a-phase) component, the rest of the circuit corresponding to the other phases is constructed in a similar way. In FIG. 2, the same reference numerals as used in FIG. 1 are used for identifying corresponding components. Here, the inverter 101 takes the form of a transistor inverter.

In FIG. 2, reference numeral 104a1 denotes an a-phase winding of the electric motor 103, and 104a2 denotes an equivalence of counter electromotive force of the winding 104a, with its magnitude represented by Vm. An a-phase switch arm 101a of the inverter 101 includes transistors 101a1, 101a2, and diodes 101a3, 101a4 that are respectively connected in parallel with the transistors 101a1, 101a2 in the reverse direction. In FIG. 2, Vc is the voltage of the variable-voltage energy storage element 105, and Vi is the input voltage of the inverter 101. The polarities of these voltages Vc, Vi are indicated in FIG. 2. The operation of the electric system when driving the motor 103 will be described referring to FIG. 2.

When the transistor 101a2 is turned on under conditions that Vc<Vm and Vi>Vc, the reactor current (current through the winding 104a1) $I_1$ flows in the direction of the broken line shown in FIG. 2, and this current gradually increases. Upon turn-off of the transistor 101a2, the reactor current $I_1$ passes through the diode 101a3 in the direction of the one-dot chain line shown in FIG. 2, to charge the capacitor 102, and gradually decreases. Namely, the energy stored in the variable-voltage energy storage element 104 is transferred to the capacitor 102 of the inverter input circuit. The energy thus transferred to the input capacitor 102 is used for driving the electric motor 103 during a normal inverter operation of the inverter 101. In FIG. 2, the transistors 101a1, 101a2, and the reactor (winding 104a1) operate as a step-up chopper.

If the power supplied from the on-vehicle dc power supply 106 is smaller than the power required by the inverter 101 while the motor is being driven (i.e., while the electric vehicle is being accelerated), the above-described operation is performed so that the power is discharged from the variable-voltage energy storage element 105, and supplied to the inverter 101. Thus, chopper control is performed so as to control the inverter input voltage to a specified value, and the power is transferred from the variable-voltage energy storage element 105 to the dc input side of the inverter 101.

Since the above-described control makes it possible to supply sufficiently larger power from the variable-voltage energy storage element 105 to the inverter 101 during acceleration of the vehicle, the on-vehicle dc power supply 106 is only required to supply an average power for normal vehicle running, which is smaller than the power required for acceleration of the vehicle.

Figure 3:
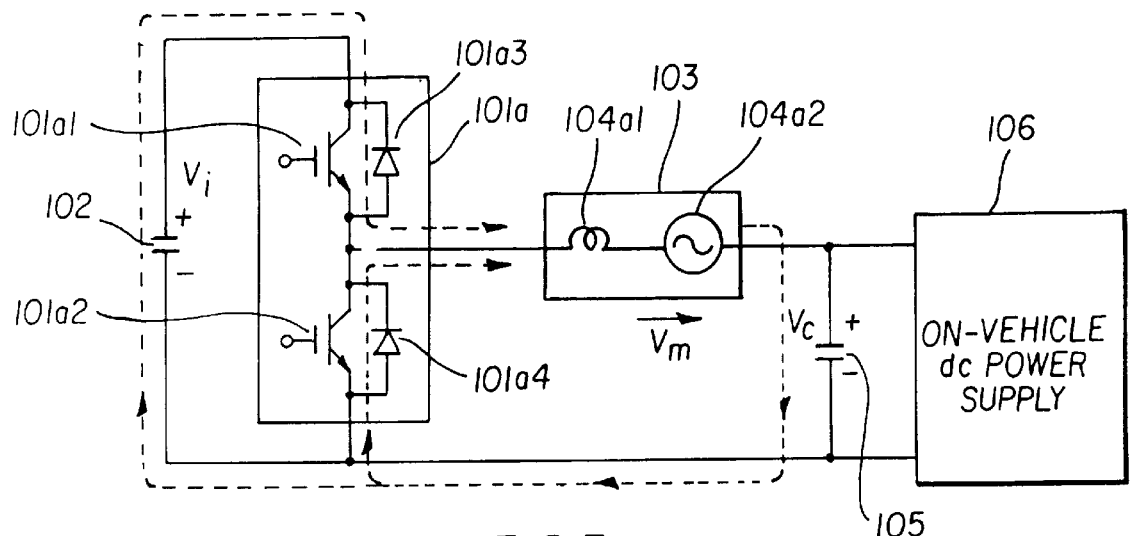
FIG. 3 is a view showing the operation of a step-down chopper of the system of FIG. 1.

The operation of the electric system during deceleration of the electric motor 103 will be now described referring to FIG. 3 corresponding to FIG. 2. In FIG. 3, the same reference numerals as used in FIG. 2 are used for identifying the same components.

When the transistor 101a1 is turned on while $V_1>(Vc+Vm)$, the reactor current $I_1$ flows in the direction of the broken line shown in FIG. 3, and also increases. Upon turn-off of the transistor 101a1, the reactor current $I_1$ passes through the diode 101a4 in the direction of the one-dot chain line of FIG. 3. Since Vc is smaller than Vm, the reactor current $I_1$ gradually decreases. In FIG. 3, the transistors 101a1, 101a3, and the reactor (winding 104a1) cooperate to operate as a step-down chopper. Thus, the power of the input capacitor 102 is transferred to the variable-voltage energy storage element 105, so as to charge the element 105.

While a brake is being applied to the electric vehicle, the braking power is stored in the input capacitor 102, and this regenerative power is transferred to the voltage-variable energy storage element 105 due to the step-down chopper operation as described above. If the system is controlled in the same manner as in the acceleration period so that a large portion of the regenerative power is charged into the variable-voltage energy storage element 105, the regenerative power stored into the on-vehicle dc power supply 106 can be reduced. Namely, the regenerative power stored in the on-vehicle dc power supply 106 can be made almost zero or considerably reduced, by charging most of the regenerative power of the electric vehicle into the voltage-variable energy storage element 105.

To perform the step-up chopper operation and step-down chopper operation as described above, the inverter 101 is caused to operate in the zero-voltage vector mode. While the zero-voltage vector is being generated, the switch arm of each phase of the inverter 101 as shown in FIG. 2 and FIG. 3 can be regarded as a single switch arm. Owing to the step-up and step-down operations of the chopper consisting of the switch arm and the reactor, the power is transferred between the variable-voltage energy storage element 105 and the input capacitor 102 during the driving and braking periods of the motor 103, and therefore the responsibility of the on-vehicle dc power supply 106 for charging and discharging can be significantly reduced.

Figure 4:
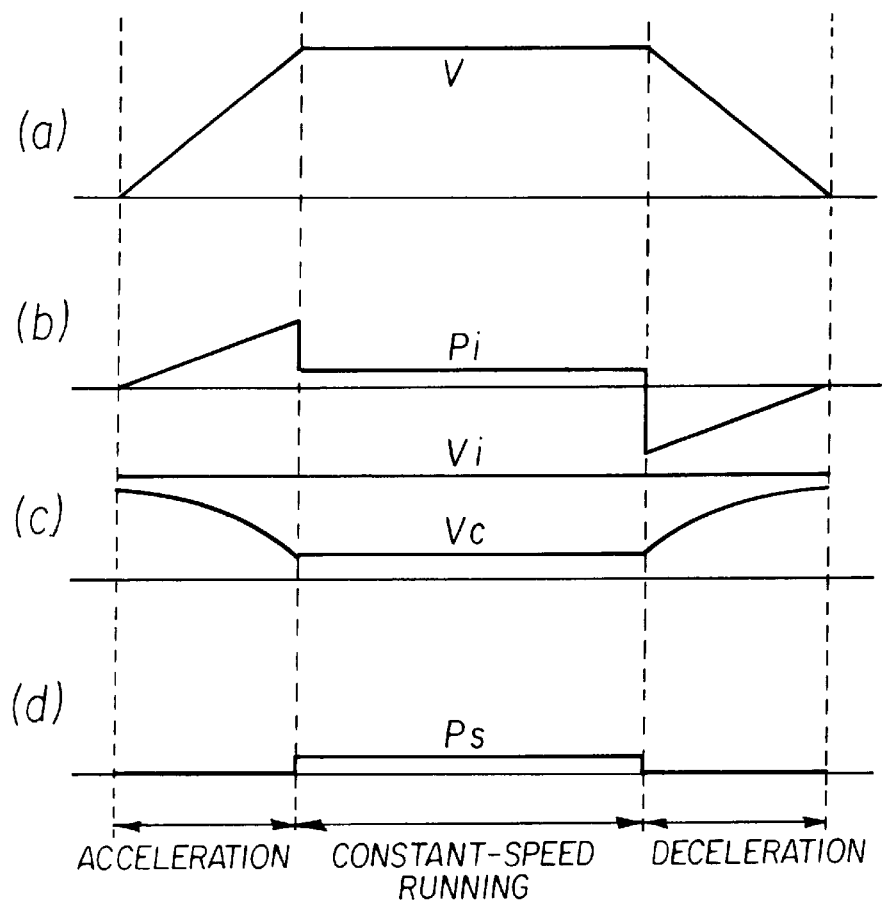
FIG. 4 is a graph useful in explaining the operation of the system of FIG. 1 in each of the operating modes of the electric vehicle.
Figure 17:
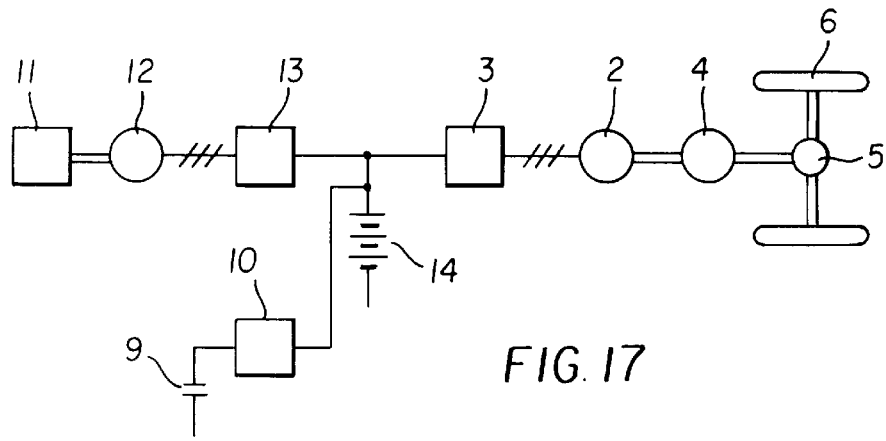
FIG. 17 is a view showing an electric system for a series type hybrid electric vehicle.
Figure 18:
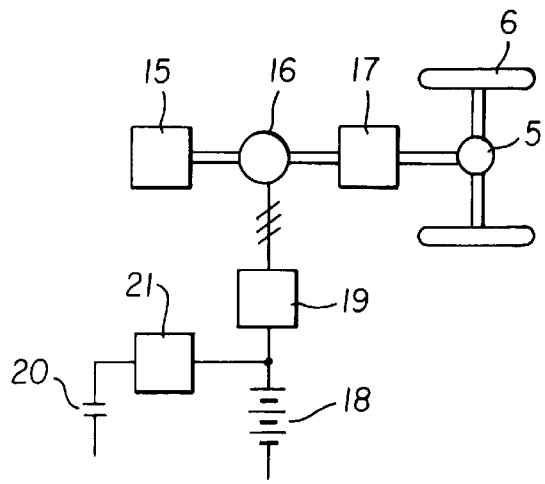
FIG. 18 is a view showing an electric system for a parallel type hybrid electric vehicle.
Figure 19:
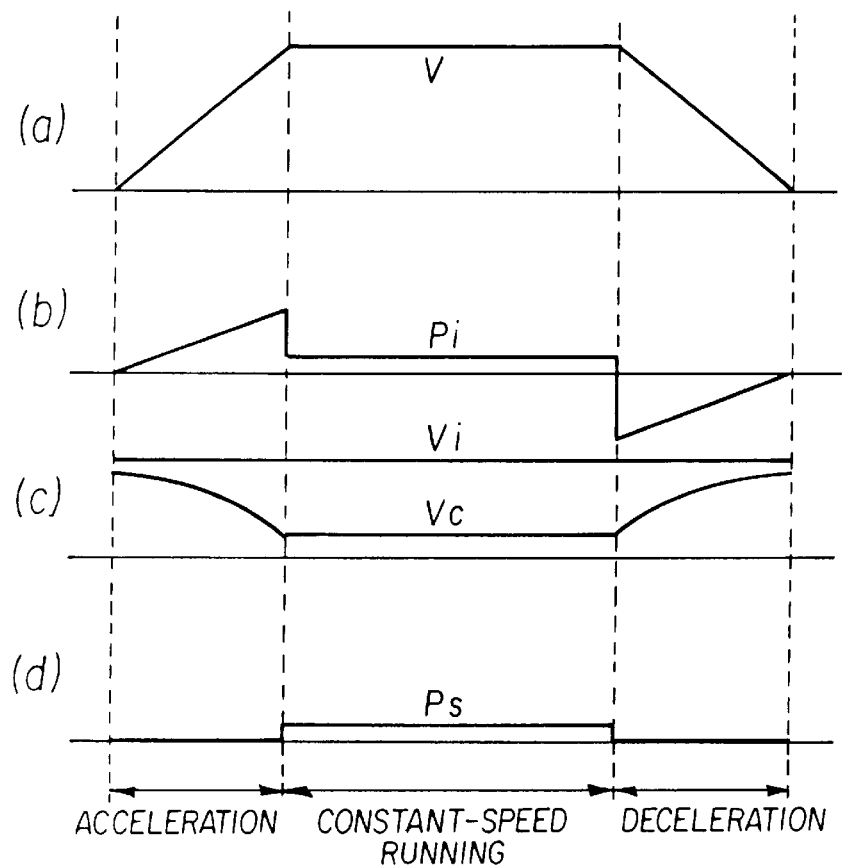
FIG. 19 is a graph useful in explaining the operation of the systems of FIG. 16 through FIG. 18 in each of the operating modes of the electric vehicle.
Figure 20:
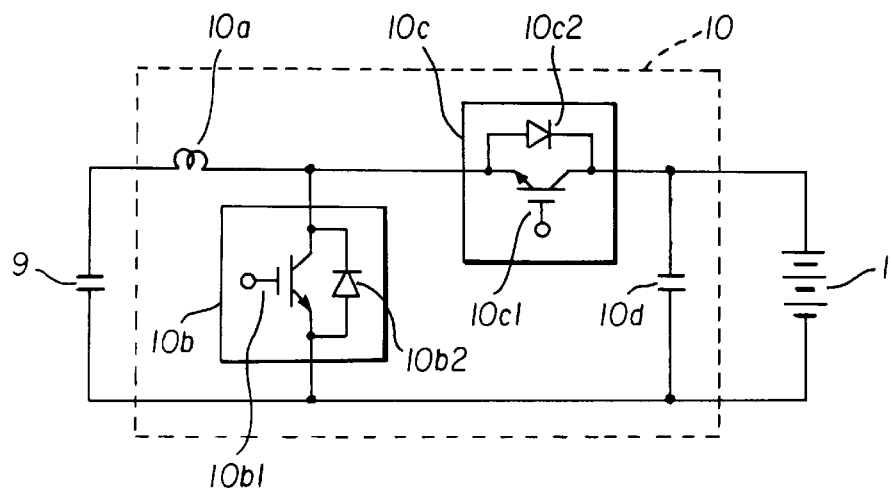
FIG. 20 is a view showing the configuration of the chopper of the system of FIG. 16.
Figure 21:
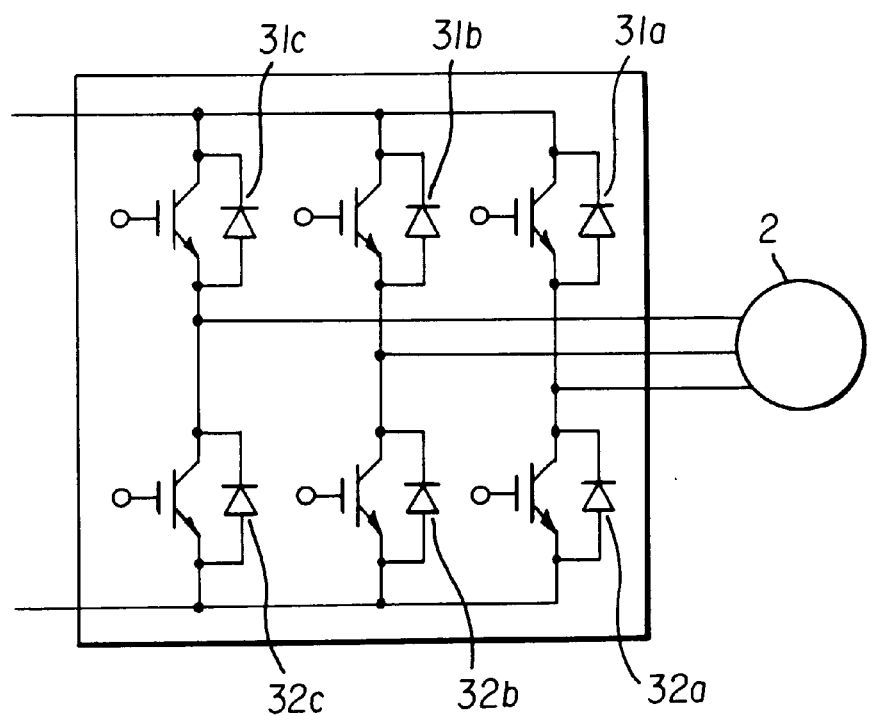
FIG. 21 is a view showing the configuration of a main circuit of a three-phase inverter.
Figure 22:
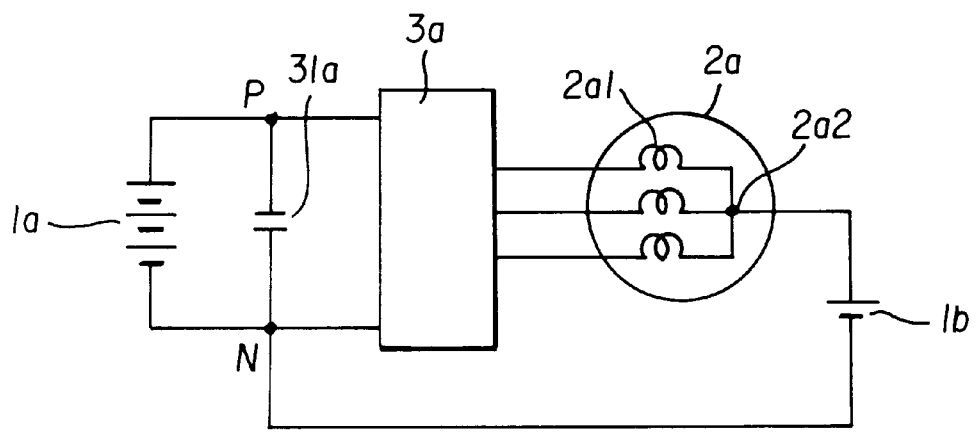
FIG. 22 is a view showing a circuit for driving an electric motor, according to the principle of the present invention.
Figure 23:
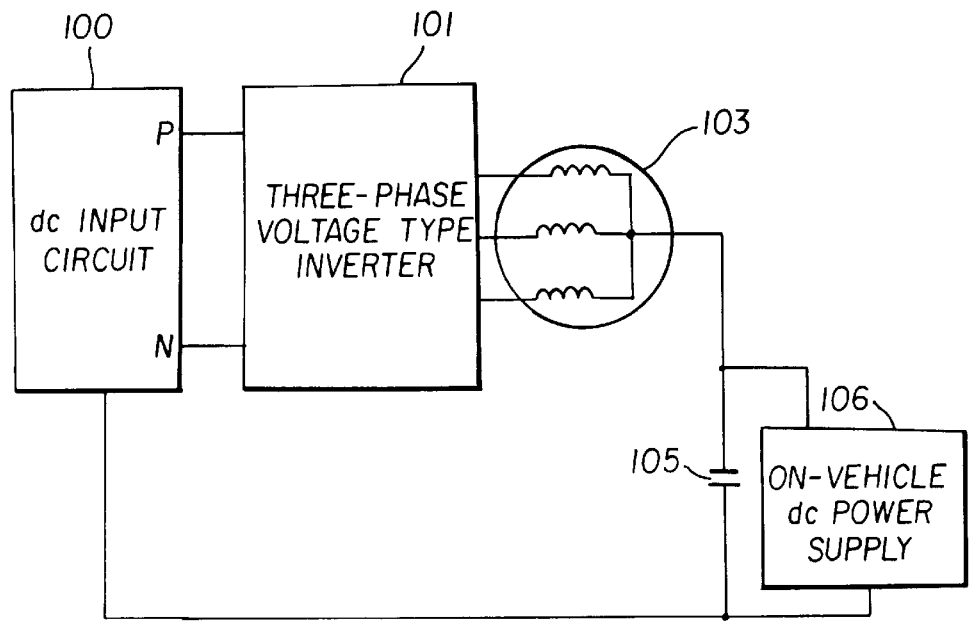
FIG. 23 is a view showing an electric system for an electric vehicle according to one aspect of the present invention.
Figure 24:
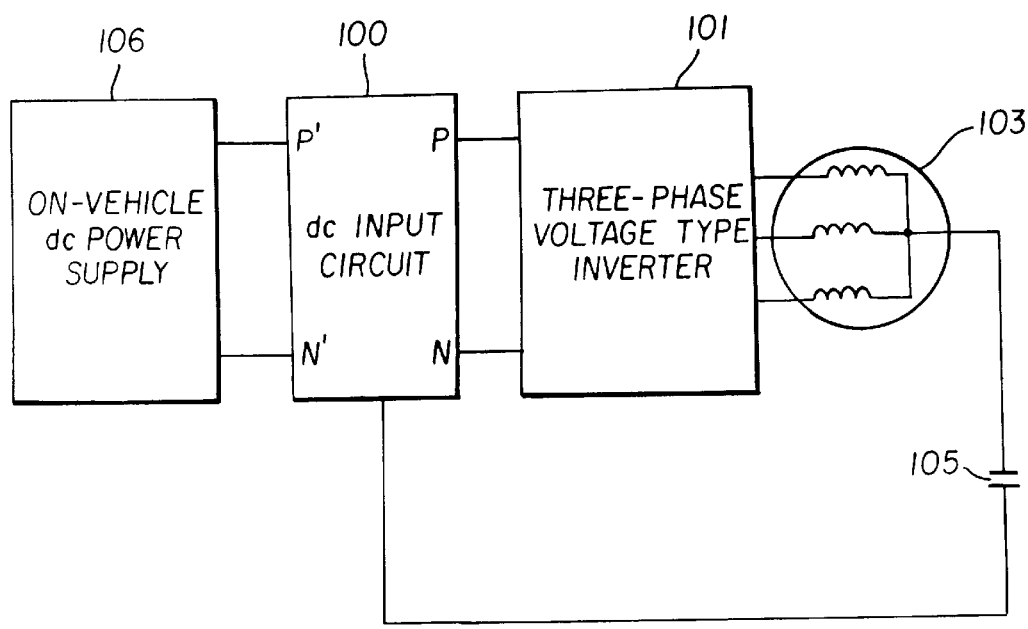
FIG. 24 is a view showing an electric system for an electric vehicle according to another aspect of the present invention.

FIG. 4, which is similar to FIG. 19, shows (a) vehicle speed V, (b) inverter input Pi, (c) voltage Vc of the variable-voltage energy storage element 105, and input voltage Vi of the inverter, and (d) output Ps of the on-vehicle dc power supply 106, that correspond to each of the operating modes (acceleration mode, constant-speed running mode, and deceleration mode) of the electric vehicle, when the operations of FIG. 2 and FIG. 3 are performed. It will be found that FIG. 4 is very similar to FIG. 19. This means that the circuit arrangement of FIG. 1, in which the inverter 101 operates as a chopper, achieves the same functions as provided by the systems of FIGS. 16–18.

While the voltage Vc of the variable-voltage energy storage element 105 is variable as shown in FIG. 4, the electric system of the present invention may operate with a constant voltage. While the input voltage Vi of the inverter is constant in the example of of FIG. 4, this voltage may be made variable.

Figure 5:
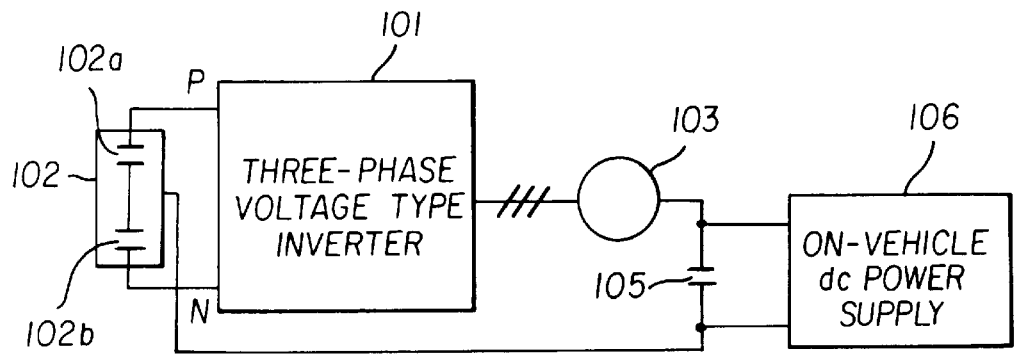
FIG. 5 is a view showing an electric system for an electric vehicle according to the second embodiment of the invention.

FIG. 5 shows the second embodiment of the present invention, wherein the same reference numeral as used in FIG. 1 are used for identifying corresponding elements. The present invention is different from the previous embodiment in that the input capacitor 102 of the inverter 101 is divided into two capacitors 102a, 102b, and one end of the variable-voltage energy storage element 105 is connected to the middle point of these capacitors 102a, 102b (i.e., middle point of the dc input voltage of the inverter).

Figure 6:
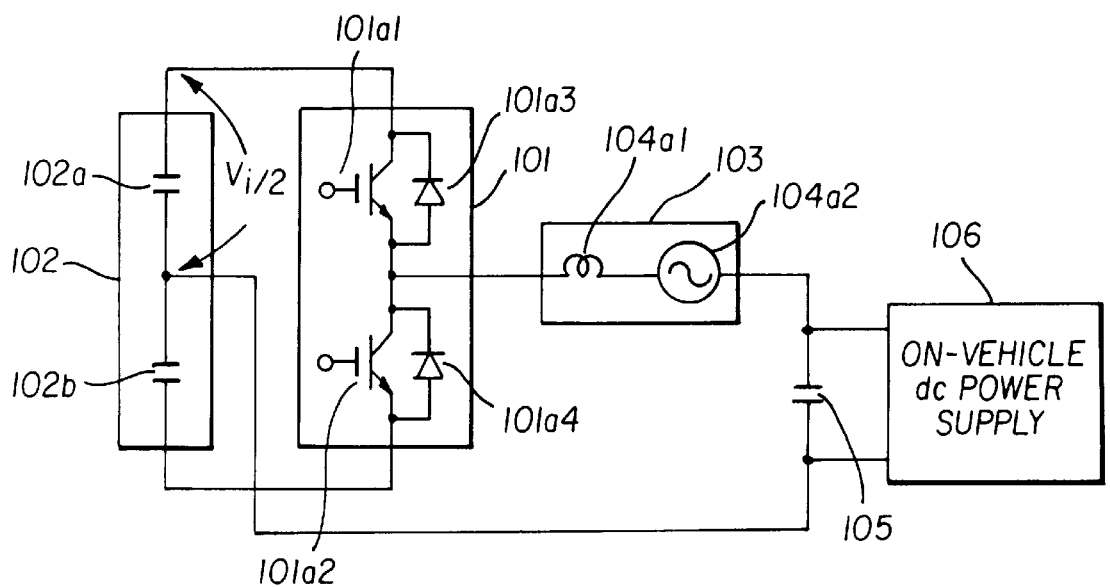
FIG. 6 is a view showing the operation of a chopper in the system of FIG. 5.

FIG. 6, which corresponds to FIG. 2 and FIG. 3, shows the operation of a chopper in the present embodiment. Since one end of the variable-voltage energy storage element 105 is connected to the middle point of the two input capacitors 102a, 102b in the present embodiment, the circuit of FIG. 6 operates in the same manner as the circuits of FIG. 2 and FIG. 3 if Vi/2, instead of Vi, is used in the description of FIG. 2 and FIG. 3, and therefore detailed description of the circuit of FIG. 6 will not be provided.

Figure 7:
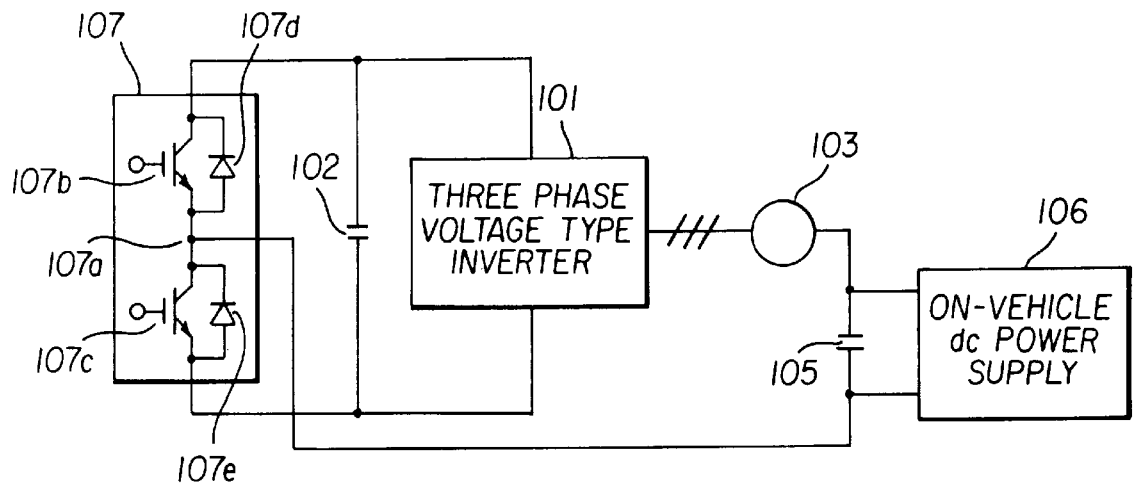
FIG. 7 is a view showing the third embodiment of the present invention.

FIG. 7 shows the third embodiment of the present invention, in which the same reference numeral as used in FIG. 1 and FIG. 5 are used for identifying corresponding elements. In FIG. 7, a semiconductor switch arm 107 includes two transistors 107b, 107c that are connected in series, and diodes 107d, 107e that are respectively connected in parallel with the transistors 107b, 107c in the reverse diction. One end of the variable-voltage energy storage element 105 is connected to a middle point 107a of the transistors 107b, 107c.

The operation of the circuit of FIG. 7 will be described referring to FIG. 8. Like FIG. 2, FIG. 8 shows a part of the circuit of FIG. 7 that corresponds to one phase (a-phase) component.

Figure 8:
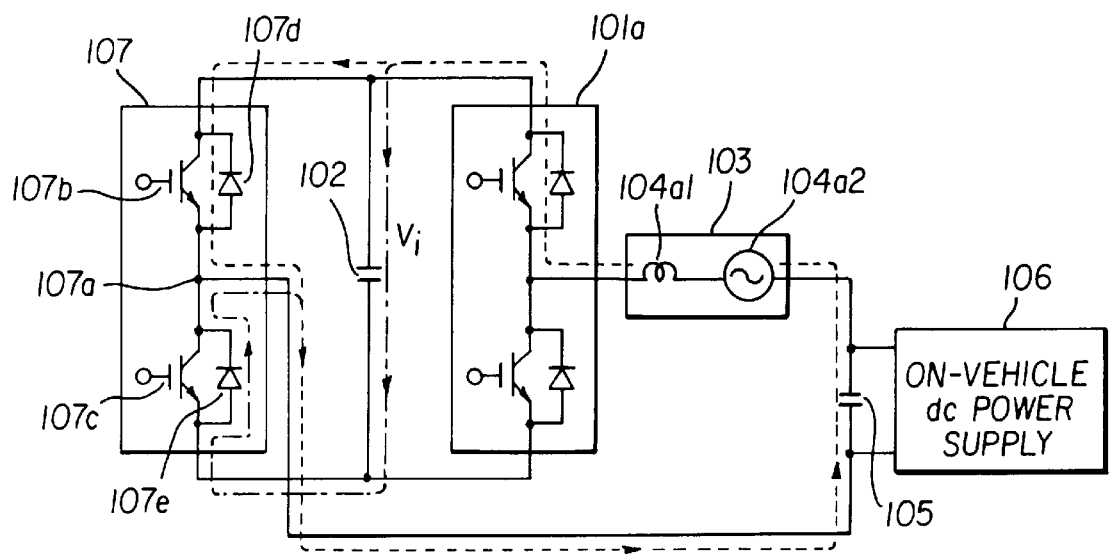
FIG. 8 is a view showing the operation of a chopper in the system of FIG. 7.

When the transistor 107b is turned on under such conditions that Vm<Vc, and Vc<(Vi+Vm), the reactor current $I_1$ flows in the direction of the broken line of FIG. 8, and this reactor current $I_1$ increases with time. Upon turn-off of the transistor 107b, the reactor current $I_1$ changes its route, and flows in the direction of the one-dot chain line of FIG. 8. Since Vc<(Vi+Vm), the reactor current $I_1$ decreases with time.

In the present embodiment, the switch arm 107 and the a-phase winding 104a of the motor 103 constitute a chopper, and the energy is supplied and received between the variable-voltage energy storage element 105 and the input capacitor 102, by switching the switch arm 107 while the inverter 101 is operating in the zero-voltage vector mode. Also, the power is transferred among the variable-voltage energy storage element 105, inverter 101, and the on-vehicle dc power supply 105, in the same manner as in the circuits of FIG. 2 and FIG. 3, and therefore detailed description of this operation will not be provided. It is to be noted that the voltage conditions that allow the chopper operation are different between the circuit of FIG. 8 and that of FIG. 1.

Figure 9:
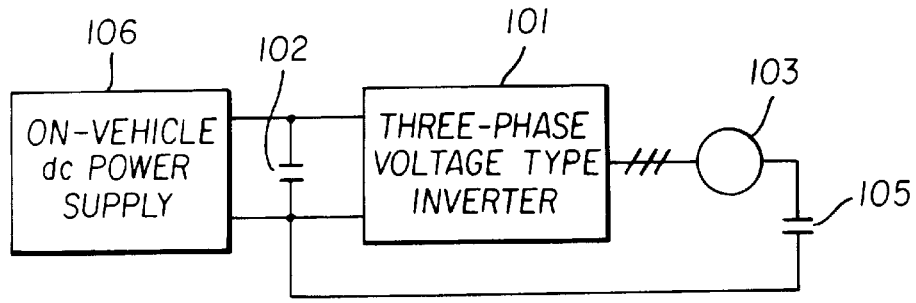
FIG. 9 is a view showing the fourth embodiment of the present invention.

FIG. 9 shows the fourth embodiment of the present invention, which is a modification of the embodiment of FIG. 1. While the on-vehicle dc power supply 106 is connected to the opposite ends of the variable-voltage energy storage element 105 in the first embodiment, the dc power supply 106 of the present embodiment is connected to the dc input side of the inverter 101. The chopper operations of the inverter 101 are the same as those illustrated in FIG. 2 and FIG. 3.

The average power is supplied from the on-vehicle dc power supply 106 to the inverter 101. The power is transferred between the variable-voltage energy storage element 105 and the input capacitor 102 in the same manner as in the first embodiment, and therefore this operation will not be described herein.

To control the system so that no energy is absorbed into and discharged from the variable-voltage energy storage element, the chopper operation of the inverter 101 may be stopped, namely, the output of the zero-voltage vector from the inverter 101 may be stopped. If the chopper operation is stopped, the current Ic through the variable-voltage energy storage element 105 becomes zero, and no energy is transferred between the energy storage element 105 and the input capacitor 102.

If the power discharged from the variable-voltage energy storage element 105 becomes smaller than the required input of the inverter 101, power that is lacking is supplied from the on-vehicle dc power supply 106.

Figure 10:
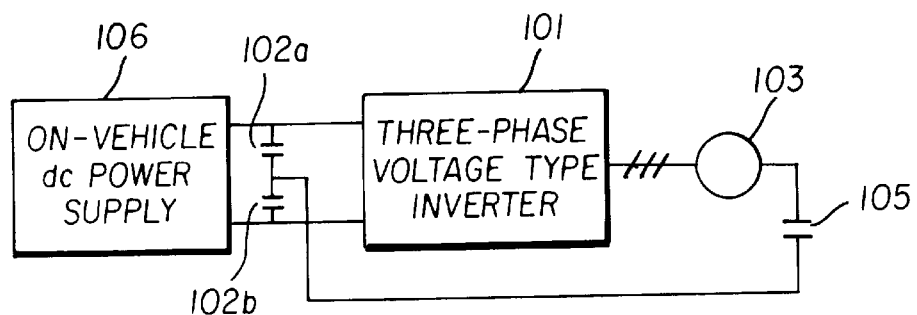
FIG. 10 is a view showing the fifth embodiment of the present invention.

FIG. 10 shows the fifth embodiment of the present invention as a modification of the second embodiment of FIG. 5. While the on-vehicle dc power supply 106 is connected to the opposite ends of the variable-voltage energy storage element 105 in the embodiment of FIG. 5, the dc power supply 106 of the present embodiment is connected to the dc input side of the inverter 101. The chopper operation of the inverter 101 and the power supply from the on-vehicle dc power supply 106 are the same as those of the embodiment of FIG. 5.

Figure 11:
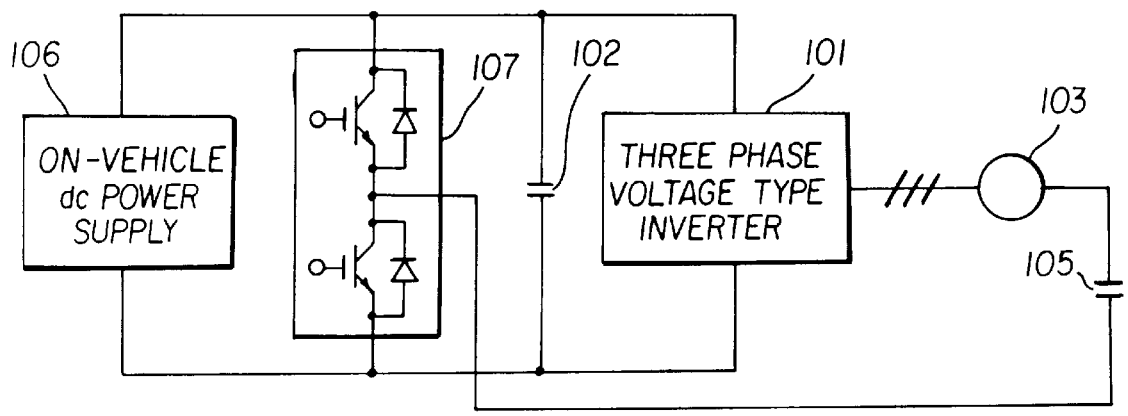
FIG. 11 is a view showing the sixth embodiment of the present invention.

FIG. 11 shows the sixth embodiment of the present invention as a modification of the third embodiment of FIG. 7. While the on-vehicle dc power supply 106 is connected to the opposite ends of the variable-voltage energy storage element 105 in the embodiment of FIG. 7, the dc power supply 106 of the present embodiment is connected to the opposite ends of the switch arm 107. The chopper operation of the switch arm 107, supply of power from the on-vehicle dc power supply 106, and other operations are performed in the same manner as in the embodiment of FIG. 7.

Figure 12:
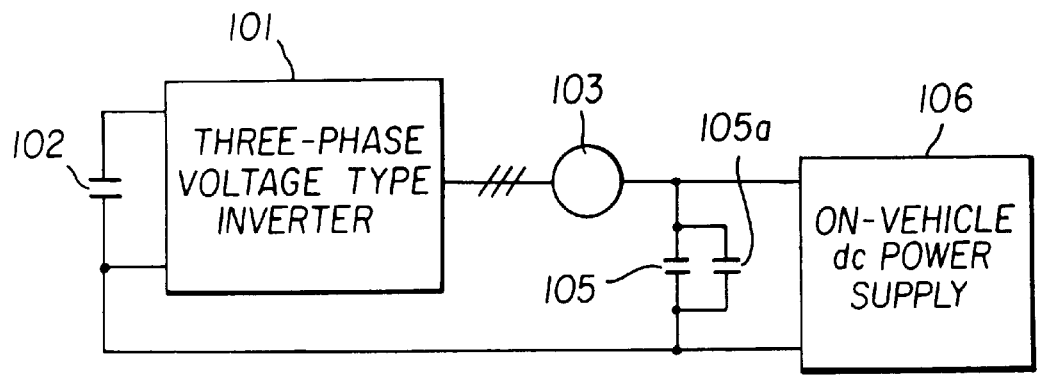
FIG. 12 is a view showing the seventh embodiment of the present invention.

FIG. 12 shows the seventh embodiment of the present invention, in which the same reference numerals as used in the previous embodiments are used for identifying corresponding elements.

Generally, the variable-voltage energy storage element has an insufficient capability of absorbing current with such a high frequency as the switching frequency of the inverter. If the variable-voltage energy storage element, which has large high-frequency impedance, is used at the switching frequency of the inverter, the terminal voltage of the energy storage element is increased, with the result of an increased loss. In the present embodiment, therefore, a capacitor 105a for absorbing high-frequency current as shown in FIG. 12 is connected in parallel with the variable-voltage energy storage element 105.

Figure 13:
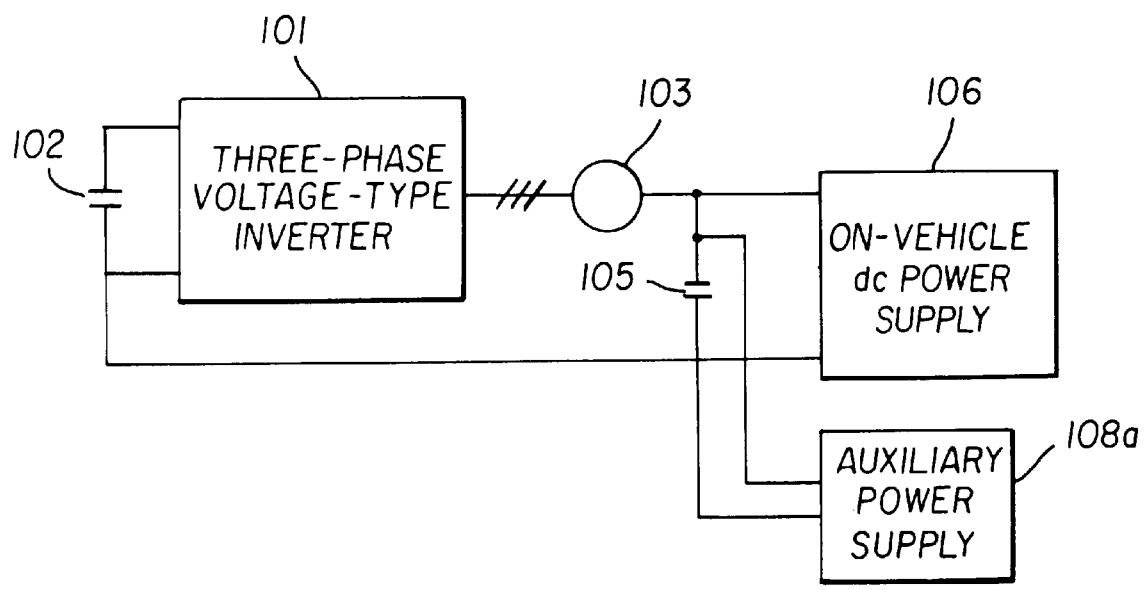
FIG. 13 is a view showing the eighth embodiment of the present invention.

FIG. 13 shows an electric system according to the eighth embodiment of the present invention. The principal part of the system is identical with that of the embodiment of FIG. 1. The system of the present embodiment farther includes an auxiliary power supply 108 for a motor vehicle that supplies power to an auxiliary electric motor to drive accessories, such as an air conditioner. The auxiliary power supply 108a is connected to the opposite ends of the variable-voltage energy storage element 105. This arrangement may also be applied to the embodiments of FIGS. 5, 7, 9, 10, 11 and 12.

Figure 14:
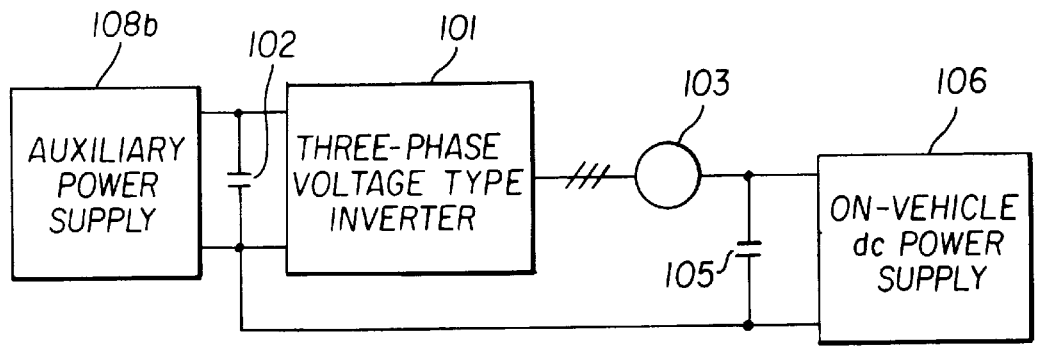
FIG. 14 is a view showing the ninth embodiment of the present invention.

FIG. 14 shows an electric system according to the ninth embodiment of the present invention. The principal part of the system is identical with that of the first embodiment of FIG. 1. The system of the present embodiment further includes an auxiliary power supply 108b for a motor vehicle that is connected to the opposite ends of the input capacitor 102. This arrangement may also be applied to the embodiments of FIGS. 5, 7, 9, 10, 11 and 12.

Figure 15:
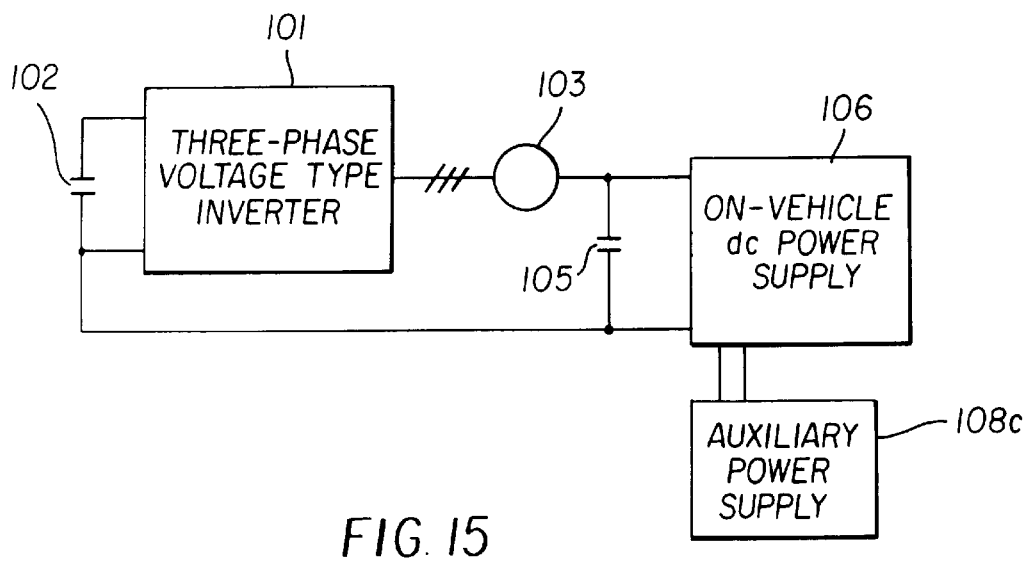
FIG. 15 is a view showing the tenth embodiment of the present invention.

FIG. 15 shows an electric system according to the tenth embodiment of the present invention. The principal part of the system is identical with that of the first embodiment of FIG. 1. The system of the present embodiment further includes an auxiliary power supply 108c for a motor vehicle that is connected to the on-vehicle dc power supply 106. This arrangement may also be applied to the embodiments of FIGS. 5, 7, 9, 10, 11 and 12.

Next, the relationships among the voltage Vc of the variable-voltage energy storage element 105, input voltage Vi of the inverter 101, and the terminal voltage (between lines, effective value) of the motor 103 will be explained.

In the embodiment of FIG. 1, the above-indicated voltages are determined so as to satisfy the following equations, and the inverter 101 performs normal PWM control.

$$Vi \geq Vc + Vm/\sqrt{3}$$

$$Vi - Vm/\sqrt{3} \geq Vc \geq Vm/\sqrt{3}$$

In the embodiment of FIG. 5, the above-indicated voltages are determined so as to satisfy the following equations, and the inverter 11 performs normal PWM control.

$$Vi/2 - Vm/\sqrt{3} \geq Vc \geq Vm/\sqrt{3} - Vi/2$$

$$Vi \geq 2(Vc + Vm/\sqrt{3})$$

In the embodiment of FIG. 7, the above voltages are determined so as to satisfy the following equations, and the inverter 101 performs normal PWM control.

$$Vi \geq Vc + Vm/\sqrt{3}$$

$$0 \leq Vc \leq Vi - Vm/3$$

In the embodiment of FIG. 7, the above voltages may be determined so as to satisfy the following equations. In this case, the inverter 101 performs normal PAM control.

$$Vi \geq Vc + Vm/\sqrt{3}$$

$$0 \leq Vc \leq Vi/3$$

As described above, according to the present invention, the variable-voltage energy storage element, such as a capacitor, is connected between the neutral point of windings of the ac motor and the dc input side of the inverter. The inverter or semiconductor switch arm may operate as a chopped, by using the windings of the motor as reactors, and utilizing the operation of the inverter in the zero-voltage vector mode.

Owing to the chopper operation as described above, the energy is discharged from the variable-voltage energy storage element during acceleration (driving) of the electric vehicle, and the kinetic energy of the vehicle body is absorbed into the variable-voltage energy storage element during deceleration (braking) of the vehicle.

The above arrangement yields such effects that 1) choppers and reactors for the choppers that were needed in conventional systems can be eliminated, and 2) the dc input voltage of the inverter can be made variable. Furthermore, the following effects can be provided: 3) the size and weight of the system device can be significantly reduced, making it available at a reduced cost, and 2) the system operates with improved efficiency since the inverter can be operated with the optimum voltage value. With these advantages, the electric system of the present invention will greatly contribute to the development and generalization of electric vehicles in the future.

The invention has been described with reference to certain preferred embodiments thereof. It will be understood, however, that modifications and variations are possible within the scope of the appended claims, including the combination of various features of the illustrated embodiments.

What is claimed is:

1. An electric system for an electric vehicle, comprising:
   a dc input circuit;
   a voltage type inverter that is connected to said dc input circuit to receive input voltage from said dc input circuit, and generate variable ac voltage of a variable frequency;
   an ac motor including a plurality of windings each of which has one end connected to an ac output terminal of said voltage type inverter, the other ends of said windings being connected together to provide a neutral point of motor windings;
   a variable-voltage energy storage element connected between said neutral point and a connecting point provided in said dc input circuit; and
   an on-vehicle dc power supply connected to opposite ends of said variable-voltage energy storage element.

2. An electric system for an electric vehicle, comprising:
   a dc input circuit including input terminals;
   a voltage type inverter that is connected to said dc input circuit to receive dc input voltage from said dc input circuit, and generate variable ac voltage of a variable frequency;
   an ac motor including a plurality of windings each of which has one end connected to an ac output terminal of said voltage type inverter, the other ends of said windings being connected together to provide a neutral point of the motor windings;
   a variable-voltage energy storage element connected between said neutral point and a connecting point provided in said dc input circuit; and
   an on-vehicle dc power supply connected to said input terminals of said dc input circuit.

3. An electric system for an electric vehicle according to claims 1, wherein said variable-voltage storage element is connected to one of output terminals of said dc input circuit as said connecting point provided in said dc input circuit.

4. An electric system for an electric vehicle according to claim 1, wherein said variable-voltage storage element is connected to a middle point of output terminals of said dc input circuit as said connecting point provided in said dc input circuit.

5. An electric system for an electric vehicle according to claim 1, wherein said dc input circuit comprises a semiconductor switch arm comprising a series circuit of two semiconductor switching devices each of which is connected in parallel with a diode in a reverse direction, and wherein said variable-voltage energy storage element is connected to a middle point of said semiconductor switch arm as said connecting point provided in said dc input circuit.

6. An electric system for an electric vehicle according to claim 2, wherein said variable-voltage storage element is connected to one of output terminals of said dc input circuit as said connecting point provided in said dc input circuit.

7. An electric system for an electric vehicle according to claim 2, wherein said variable-voltage storage element is connected to a middle point of output terminals of said dc input circuit as said connecting point provided in said dc input circuit.

8. An electric system for an electric vehicle according to claim 2, wherein said dc input circuit comprises a semiconductor switch arm comprising a series circuit of two semiconductor switching devices each of which is connected in parallel with a diode in a reverse direction, and wherein said variable-voltage energy storage element is connected to a middle point of said semiconductor switch arm as said connecting point provided in said dc input circuit.

9. An electric system for an electric vehicle according to claim 1, wherein said inverter operates as a chopper in a zero-voltage vector mode, so that power is transferred between said variable-voltage energy storage element and said dc input circuit.

10. An electric system for an electric vehicle according to claim 2, wherein said inverter operates as a chopper in a zero-voltage vector mode, so that power is transferred between said variable-voltage energy storage element and said dc input circuit.

11. An electric system for an electric vehicle according to claim 5, wherein said semiconductor switching arm is turned on and off to perform a chopper operation while said inverter is operating in a zero-voltage vector mode, so that power is transferred between said variable-voltage energy storage element and said dc input circuit.

12. An electric system for an electric vehicle according to claim 8, wherein said semiconductor switching arm is turned on and off to perform a chopper operation while said inverter is operating in a zero-voltage vector mode, so that power is transferred between said variable-voltage energy storage element and said dc input circuit.

13. An electric system for an electric vehicle according to claim 4, wherein the middle point of the output terminals of said dc input circuit is provided by a connecting point of a plurality of input capacitors that are connected in series.

14. An electric system for an electric vehicle according to claim 7, wherein the middle point of the output terminals of said dc input circuit is provided by a connecting point of a plurality of input capacitors that are connected in series.

15. An electric system for an electric vehicle according to claim 1, wherein said variable-voltage energy storage element comprises one of an electric double layer capacitor and an electrochemical capacitor.

16. An electric system for an electric vehicle according to claim 2, wherein said variable-voltage energy storage element comprises one of an electric double layer capacitor and an electrochemical capacitor.

17. An electric system for an electric vehicle according to claim 1, further comprising a capacitor for absorbing high-frequency current, said capacitor being connected in parallel with said variable-voltage energy storage element.

18. An electric system for an electric vehicle according to claim 2, further comprising a capacitor for absorbing high-frequency current, said capacitor being connected in parallel with said variable-voltage energy storage element.

19. An electric system for an electric vehicle according to claim 1, wherein a voltage of the variable-voltage energy storage element or the dc voltage applied to said voltage type inverter is controlled to be constant, or variable depending upon operating conditions of said ac motor.

20. An electric system for an electric vehicle according to claim 2, wherein a voltage of the variable-voltage energy storage element or the dc voltage applied to said voltage type inverter is controlled to be constant, or variable depending upon operating conditions of said ac motor.

21. An electric system for an electric vehicle according to claim 1, wherein said ac motor is an electric motor for driving the vehicle.

22. An electric system for an electric vehicle according to claim 2, wherein said ac motor is an electric motor for driving the vehicle.

23. An electric system for an electric vehicle according to claim 1, wherein said ac motor is an electric motor for driving accessories of the vehicle.

24. An electric system for an electric vehicle according to claim 2, wherein said ac motor is an electric motor for driving accessories of the vehicle.

25. An electric system for an electric vehicle according to claim 3, wherein said dc input circuit comprises a capacitor connected between the output terminals of said dc input circuit as an input capacitor of said voltage type inverter.

26. An electric system for an electric vehicle according to claim 6, wherein said dc input circuit comprises a capacitor connected between the output terminals of said dc input circuit as an input capacitor of said voltage type inverter.

27. An electric system of an electric vehicle according to claim 1, wherein said on-vehicle dc power supply comprises a chemical battery.

28. An electric system of an electric vehicle according to claim 2, wherein said on-vehicle dc power supply comprises a chemical battery.

29. An electric system for an electric vehicle according to claim 1, wherein said on-vehicle dc power supply comprises an engine generator.

30. An electric system for an electric vehicle according to claim 2, wherein said on-vehicle dc power supply comprises an engine generator.

31. An electric system for an electric vehicle according to claim 1, wherein said on-vehicle dc power supply comprises a fuel battery.

32. An electric system for an electric vehicle according to claim 2, wherein said on-vehicle dc power supply comprises a fuel battery.

33. An electric system of an electric vehicle according to claim 3, wherein the dc voltage Vi applied to said voltage type inverter, a voltage Vc of said variable-voltage energy storage element, and a terminal voltage (between lines) Vm of said ac motor have relationships as represented by $$Vi \geq Vc + Vm/\sqrt{3}$$

$$Vi - Vm/\sqrt{3} \geq Vc \geq Vm/\sqrt{3}.$$

34. An electric system of an electric vehicle according to claim 6, wherein the dc voltage Vi applied to said voltage type inverter, a voltage Vc of said variable-voltage energy storage element, and a terminal voltage (between lines) Vm of said ac motor have relationships as represented by $$Vi \geq Vc + Vm/\sqrt{3}$$

$$Vi - Vm/\sqrt{3} \geq Vc \geq Vm/\sqrt{3}.$$

35. An electric system for an electric vehicle according to claim 4, wherein the dc voltage Vi applied to said voltage type inverter, a voltage Vc of said variable-voltage energy storage element, and a terminal voltage (between lines) Vm of said ac motor have relationships as represented by $$Vi/2 - Vm/\sqrt{3} \geq Vc \geq Vm/\sqrt{3} - Vi/2$$

$$Vi \geq 2(Vc + Vm/\sqrt{3}).$$

36. An electric system for an electric vehicle according to claim 7, wherein the dc voltage Vi applied to said voltage type inverter, a voltage Vc of said variable-voltage energy storage element, and a terminal voltage (between lines) Vm of said ac motor have relationships as represented by $$Vi/2 - Vm/\sqrt{3} \geq Vc \geq Vm/\sqrt{3} - Vi/2$$

$$Vi \geq 2(Vc + Vm/\sqrt{3}).$$

37. An electric system for an electric vehicle according to claim 5, wherein the dc voltage Vi applied to said voltage type inverter, a voltage Vc of said variable-voltage energy storage element, and a terminal voltage (between lines) Vm of said ac motor have relationships as represented by $$Vi \geq Vc + Vm/\sqrt{3}$$

$$0 \leq Vc \leq Vi - Vm/\sqrt{3}.$$

38. An electric system for an electric vehicle according to claim 8, wherein the dc voltage Vi applied to said voltage type inverter, a voltage Vc of said variable-voltage energy storage element, and a terminal voltage (between lines) Vm of said ac motor have relationships as represented by $$Vi \geq Vc + Vm/\sqrt{3}$$

$$0 \geq Vc \geq Vi - Vm/\sqrt{3}.$$

39. An electric system for an electric vehicle according to claim 5, wherein the dc voltage Vi applied to said voltage type inverter Vi, a voltage Vc of said variable-voltage energy storage element, and a terminal voltage (between lines) Vm of said ac motor have relationships as represented by $$Vi \geq Vc + Vm/\sqrt{3}$$

$$0 \leq Vc \leq Vi/3.$$

40. An electric system for an electric vehicle according to claim 8, wherein the dc voltage Vi applied to said voltage type inverter Vi, a voltage Vc of said variable-voltage energy storage element, and a terminal voltage (between lines) Vm of said ac motor have relationships as represented by $$Vi \geq Vc + Vm/\sqrt{3}$$

$$0 \leq Vc \leq Vi/3.$$

* * * * *